United States Patent
Emerson et al.

(10) Patent No.: US 10,131,392 B2
(45) Date of Patent: Nov. 20, 2018

(54) RECHARGEABLE BICYCLE LIGHT SYSTEM

(71) Applicant: Light & Motion Industries, Marina, CA (US)

(72) Inventors: Daniel T. Emerson, Carmel, CA (US);
Jarod Armer, Royal Oaks, CA (US);
Benjamin McGeever, Shoreline, WA (US); David Heiss, Mukilteo, WA (US);
Kevin Govan, Lynnwood, WA (US);
Eric Simon, Del Rey Oaks, CA (US);
David William Tolan, Carmel, CA (US)

(73) Assignee: Light & Motion Industries, Marina, CA (US)

( * ) Notice: Subject to any disclaimer, the term of this patent is extended or adjusted under 35 U.S.C. 154(b) by 0 days.

(21) Appl. No.: 15/331,543

(22) Filed: Oct. 21, 2016

(65) Prior Publication Data

US 2018/0111654 A1   Apr. 26, 2018

(51) Int. Cl.
| B62J 6/00 | (2006.01) |
| F21V 23/00 | (2015.01) |
| B62J 6/02 | (2006.01) |
| B62J 6/04 | (2006.01) |
| B62J 6/16 | (2006.01) |
| F21V 21/40 | (2006.01) |
| F21V 31/00 | (2006.01) |

(Continued)

(52) U.S. Cl.
CPC ............... *B62J 6/005* (2013.01); *B62J 6/02* (2013.01); *B62J 6/04* (2013.01); *B62J 6/16* (2013.01); *F21V 23/004* (2013.01); *B62J 2006/006* (2013.01); *B62J 2300/008* (2013.01); *F21L 4/08* (2013.01); *F21V 21/406* (2013.01); *F21V 31/005* (2013.01); *F21Y 2115/10* (2016.08)

(58) Field of Classification Search
None
See application file for complete search history.

(56) References Cited

U.S. PATENT DOCUMENTS 8,770,808 B1 * 7/2014 Campbell ............... B62J 11/00
362/473
9,113,504 B1 * 8/2015 Hamasaki .............. H05B 37/02
(Continued)

OTHER PUBLICATIONS

Lezyne, description and views of Lezyne Hecto Drive 350XL USB style light, print from Lezyne.com website, copyright 2016, Lezyne, 4 pages.
(Continued)

*Primary Examiner* — Julie Lieu
(74) *Attorney, Agent, or Firm* — Thomas M. Freiburger

(57) ABSTRACT

A bicycle tail light or front light has a mounting base to connect to the bicycle, and an LED light unit for insertion into and removal from the base. The light unit includes a printed circuit board with LED driver and a rechargeable battery, all of which are encapsulated by a direct overmolding that forms a casing for the unit. For charging the light unit is pulled out from the base and plugged into a USB port. A tongue with USB blade at the back of the light unit functions to secure the light unit to the mounting base, and the attachment of the units switches power to the light unit. A motion detector on the PCB shuts off the LED if no motion is detected for several minutes, thus eliminating need for any exterior switch.

21 Claims, 16 Drawing Sheets

(51) Int. Cl.
 F21L 4/08 (2006.01)
 F21Y 115/10 (2016.01)

(56) References Cited

U.S. PATENT DOCUMENTS

| | | | | |
|---|---|---|---|---|
| 2011/0148611 A1* | 6/2011 | Ni | ............................. | B62J 6/04 |
| | | | | 340/432 |
| 2012/0182748 A1* | 7/2012 | McCaslin | .............. | A42B 3/044 |
| | | | | 362/473 |
| 2013/0141933 A1* | 6/2013 | Leonardo | ................... | B62J 6/02 |
| | | | | 362/523 |
| 2013/0301285 A1* | 11/2013 | McCaslin | ................ | B62J 6/003 |
| | | | | 362/473 |
| 2013/0307678 A1* | 11/2013 | Ransom | ................... | B62J 6/005 |
| | | | | 340/432 |
| 2016/0001837 A1* | 1/2016 | Wan | ........................ | B62J 6/003 |
| | | | | 362/474 |
| 2016/0083033 A1* | 3/2016 | Liu | ......................... | B62J 6/003 |
| | | | | 362/474 |
| 2016/0339978 A1* | 11/2016 | Braucht | ..................... | B62J 3/00 |
| 2017/0203802 A1* | 7/2017 | Zhao | ........................ | B62J 6/005 |

OTHER PUBLICATIONS

Description and views of Specialized Stix Reflector Mount USB style light, print from Specialized.com website, copyright 2016, Specialized Bicycle Components, 2 pages.

* cited by examiner

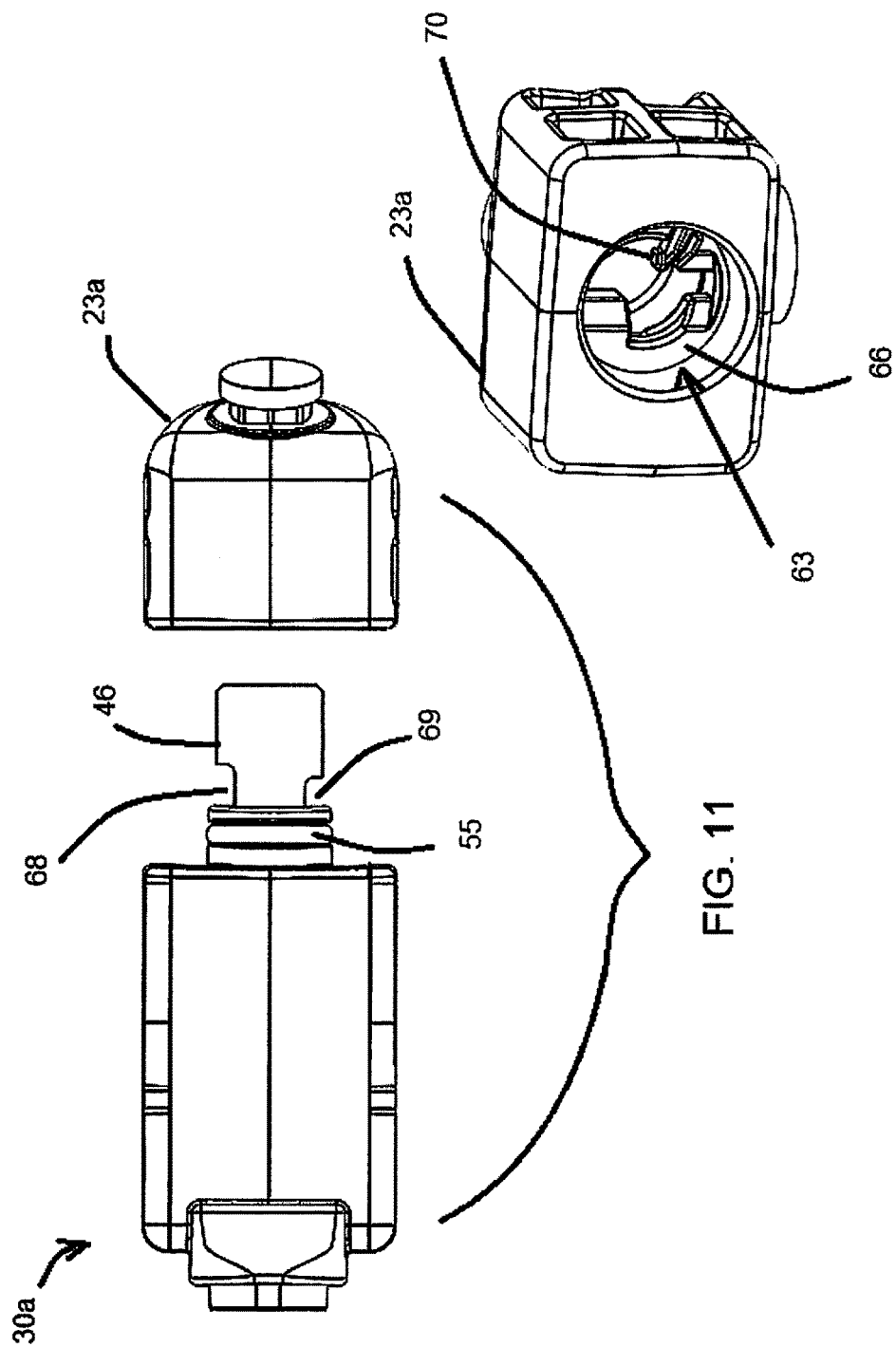

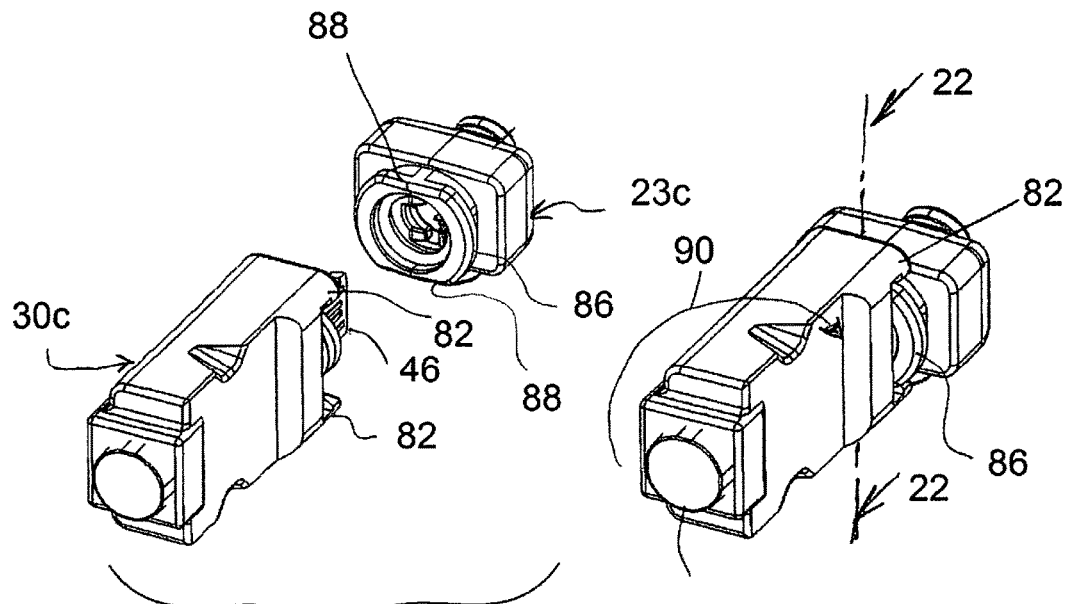
FIG. 18
FIG. 19
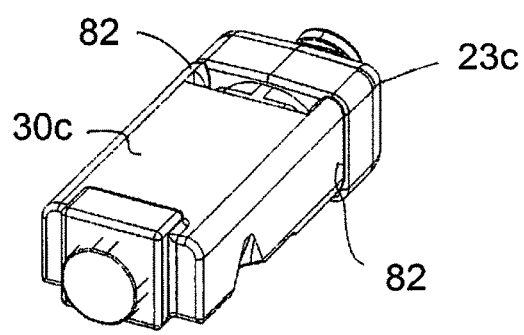
FIG. 20

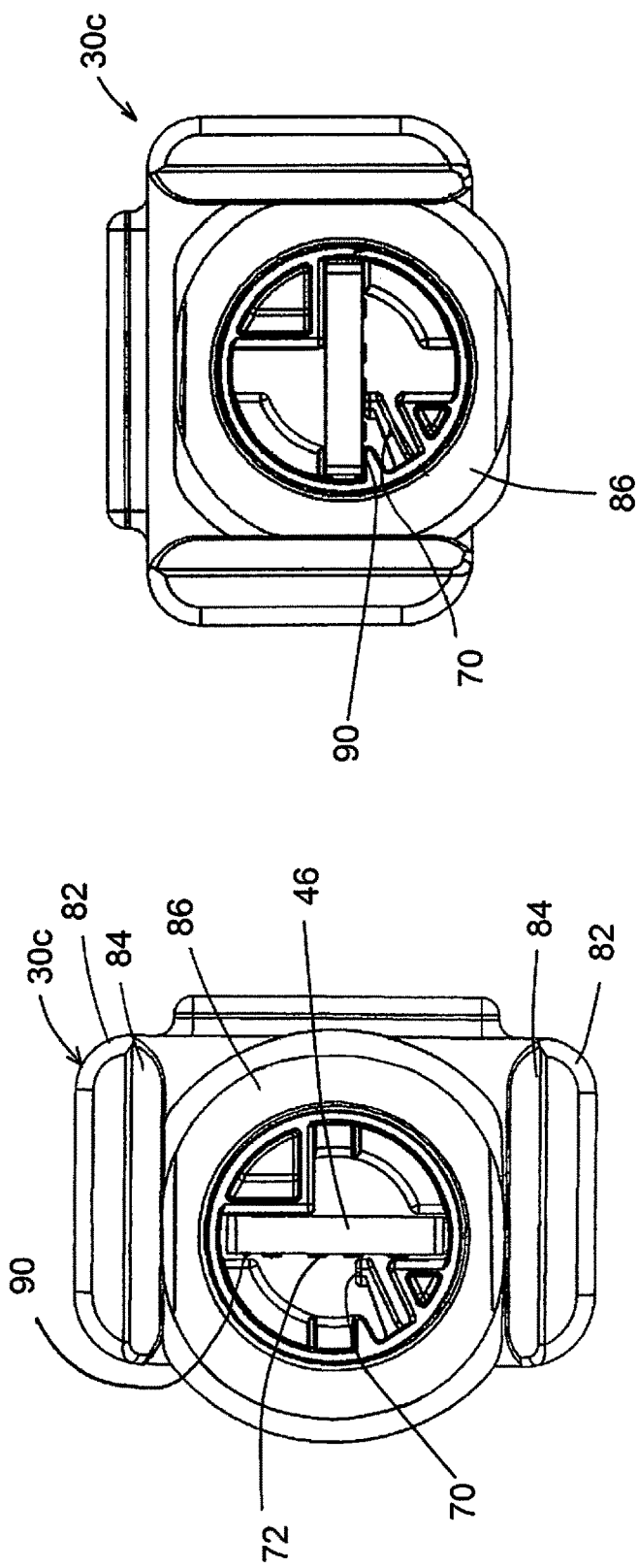

RECHARGEABLE BICYCLE LIGHT SYSTEM

BACKGROUND OF THE INVENTION

The invention concerns bicycle lights in particular, but also other rechargeable lights such as worn on the body or on a helmet, and specifically the invention is concerned with a light unit contained in but readily removable from a housing and rechargeable using USB.

A large number of different rechargeable bicycle lights have been known, many of them currently marketed. In at least one case the bicycle light had a USB connection blade at rear, the light assembly being contained within a molded casing to be mounted to the bicycle handlebar, seat post or other structure. A back end of the light, separate from the mount, could be removed from the main part of the light's casing to expose a USB contact blade. In order to recharge the battery of the light assembly using the USB connection, the light had to be removed from the bicycle and plugged into a suitable USB port, or a USB extension cord could be brought to the light. With such an assembly the entire casing unit must be waterproof for preventing moisture damage to the LED, circuit board and battery. This can be a cumbersome issue with multiple casing components and an external switch on the casing. Another problem with the construction was that it might not always be possible to recharge the battery, particularly using the USB port, because of the bulky nature of the case which can interfere with access to a typical USB port on a laptop or other convenient USB docking station. This is along with the difficulty of creating a waterproof seal around an exposed USB blade, which is a flat, thin member with exposed contacts. Even if the bicycle mounting bracket or strap were removed so that the entire case could be brought to a computer, it has not always been possible to plug the USB connection into the computer.

In typical current implementations of lights with USB blades allowing for direct plug in and charging of the light, the rigid USB blade or stick used for charging is independent of the mounting apparatus and requires a separate cover to seal the exposed USB blades during use. This makes the light larger and requires extra parts that can be lost and extra steps required to charge the light. In one existing bike light the extending USB plug-in blade was inserted into a slot of a bike-mounted base, with the slot extending entirely through the base such that the outer end of the USB blade was exposed. A cap was provided to cover the end of the blade, also to retain the light unit to the base.

Accordingly, there has been a need for a light assembly, particularly for bicycles but also for other purposes, that is reliably waterproof, easily removed from the mount, simple and economic in construction, and directly plugged into a USB port to charge without the need for intermediary cables, or extra parts to seal the USB contacts when not in use.

SUMMARY OF THE INVENTION

The new light of the invention, particularly for bicycles, has a USB connector at one end, which serves as a mounting bracket for the light when on a bicycle. However, when it is pulled out of the base unit that is secured to the bike at a handlebar or seat post or other frame member or accessory such as a luggage rack, it can be plugged into any charger for a smartphone or into a USB port of a computer or other device.

The extending USB blade is part of a contiguous circuit board that houses all the related electronics required to drive the LED. This makes the design very cost effective.

The light device of the invention, except the USB blade, is encapsulated in a type of plastic casing called low-pressure molding or low-pressure molded plastic, using hot-melt plastics. Its temperatures also are low (about 410° F. for polyamide) compared to conventional plastics, so it is possible to directly inject the material over a circuit board and even the battery and the LED in order to completely encapsulate the circuit board and battery system and form a compact, integral housing directly over the components. Pressure in the overmold cavity is low, typically about 50-200 psi. This method allows for a very simple, cost effective and waterproof enclosure compared with an equivalent molded enclosure design with housing, multiple parts, seals and assembly. It also allows the finished product to be smaller in volume than equivalent designs assembled into a case. This can be for a tail light and also for a front bike light. Low pressure molding has been used previously to encapsulate electronics but not to form a light unit as in this invention.

One feature is that the USB as a bracket, when plugged in, will have a switch on one or both sides alongside, that will allow the unit to be powered by its own battery. Thus, once the USB is pulled out of the mounting device, the light cannot be powered. Also, the unit will have, also encased in the plastic, a motion detector switch, i.e. a unit that detects its own motion. The light will stay on for several minutes after motion ceases. That way, a person can simply park the bike and the light will go off within a short time.

The design uses the exposed blade to secure the light into the mounting bracket or base which receives and holds the "tongue" including the blade and seals the exposed contacts from the environment. The overmolded material preferably creates a round barrel with a recess for an O-ring that seals against the mount or base when inserted. When the blade is inserted into the base, a spring switch or alternatively a capacitance switch is operated that switches power to the LED light circuit, allowing it to be controlled either by a manual switch activated by the user, or more preferably as noted above, by a motion sensor embedded in the circuit board that turns on the LED when motion is sensed. With the motion sensor in the circuit all the user needs to do is insert the light in the mount and ride. The light will turn on when the bike is moving and will shut off when no motion is detected after a set period of time, e.g. 2-3 minutes, as programmed into the LED circuit. Additionally the embedded motion detector eliminates the need for any user accessible switch, further simplifying the design while adding user convenience, and better facilitating waterproofing.

The light unit and the base can be latched together in any of several different ways. A preferred latch device is a co-action between the USB blade and the base unit, whereby the USB blade is pushed into the base unit, then turned ¼ turn to lock the light unit in place.

In one embodiment the switch on the light body is a momentary switch, so the pressure on the switch will turn it on when the unit is put in place. However, there are other options. One could have a magnet in the case on the bicycle, and a detector in the portable light unit that allows it to turn on when the magnet is nearby; another option is a capacitance switch, operated when the light body tongue is fully pushed in, or pushed in and turned. A still further alternative for the main switch is to have a metal bar in the socket of the base unit on the bike, positioned to short out two contacts on the USB blade, completing a circuit. A further alternative is a spring ball/detent which will act to help hold the USB in place, and also to short out two contacts at the detent, completing the circuit.

In any case the preferred design uses two switches. One switch connects power to the light unit automatically when it is inserted in the mount, but does not turn the light itself on. The second switch is a motion detector that turns the light on when motion of the unit is sensed. The advantage of this system is the user never needs to engage a switch and no switch is needed on the exterior. When the bike is parked the light remains off. When the light senses motion the light will turn on with no need for user input. In the case of a front light, a photodetector is also included so that the light does not operate in normal mode (although it may flash) in daylight. When the device is removed from the mount the light unit cannot be turned on.

The battery is flat, preferably a lithium polymer battery. It may have a capacity in the range of about 250 milliamp-hours to 1200-milliamp hours depending on the power of light head desired. A preferred embodiment has an approximately 550 MA-hour battery that allows a tail light to run at 25 lumens for four to five hours, or a head lamp to run at 200 lumens for about one hour (or at lower power for a longer period).

As noted above, the new light is waterproof, i.e. the entire light unit that removes from the base unit on the bike is waterproof. This is due to the low-pressure molded encapsulation.

With the light device of the invention the unique manufacturing technique employed to over-mold the electronics directly with the battery and preferably the LED allows for a very simple and cost effective manufacturing process with minimal tooling and no assembly into a housing. A comparable conventionally manufactured light would require two complete injection molds to create two sides of a clamshell to house the battery and electronics, a molded gasket, some provision to hold the battery and electronics from moving inside the housing, as well as seals around the exposed USB blade, which with its flat, thin rectangular shape is hard to seal against when using conventional molded parts such as O-rings. Additionally, the low-pressure molding materials are available in optically clear formulations which allow LEDs to be surface-mounted on the circuit board, to directly illuminate through the clear encapsulation, thereby further simplifying the part count and sealing of the light source. Thus, the LED or LEDs preferably are encapsulated in the overmold as part of the circuit. Side lights can be present in the encapsulated design to emit amber light directly to the sides. The optically clear overmolded material allows the side lights to shine through the encapsulation without the need for additional lensing. The rear facing red light or front facing white LED can include a lens element for focusing the light. The lens element is installed directly over the LED and attached to the circuit board as in conventional LED bike lights. The overmolded material is injected around the lens or optic (if included) creating a seal and holding the optic in place. A molded optical element embedded in the molding compound is directly sealed against the LED. This style of construction is preferred when a more controlled beam pattern is desired such as when used for a headlight. Additional optical elements may not be needed when used as a tail light.

The light of the invention is also useful as an underwater diving light, with its reliable waterproofing and compact configuration.

It is an object of the invention to provide a compact light device for bicycles and other purposes, that is simple and inexpensive in construction, reliably waterproof and conveniently used, especially in recharging. These and other objects, advantages and features of the invention will be apparent from the following description of a preferred embodiment, considered along with the accompanying drawings.

DESCRIPTION OF THE DRAWINGS

FIG. 11 is an exploded plan view showing the two components, the main light body unit and the base or leg mount, for assembly, and showing a USB column extending back from the light body unit.

FIG. 12 is a perspective view showing the mounting base.

FIGS. 18 to 21 are perspective and elevation views showing another form of latching device for connecting the light body and mounting base.

FIGS. 22 and 23 are views essentially in cross section, demonstrating the insertion of the light body of FIGS. 18-21 into the base followed by rotation of the light body to lock it to the base.

DESCRIPTION OF PREFERRED EMBODIMENTS

Figure 1A:
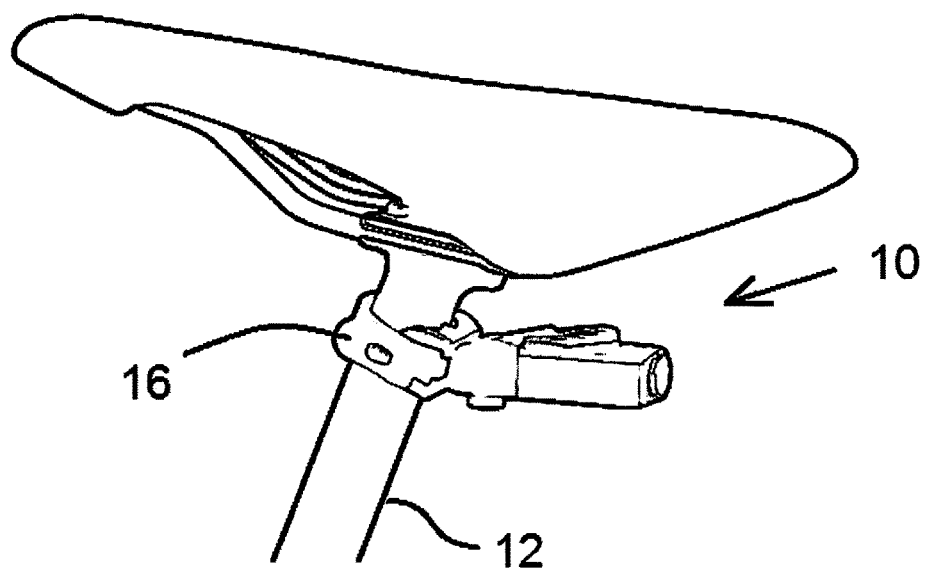
FIGS. 1A and 1B are perspective views showing a bicycle light of the invention attached on a seat post and on a handlebar, respectively.
Figure 1B:
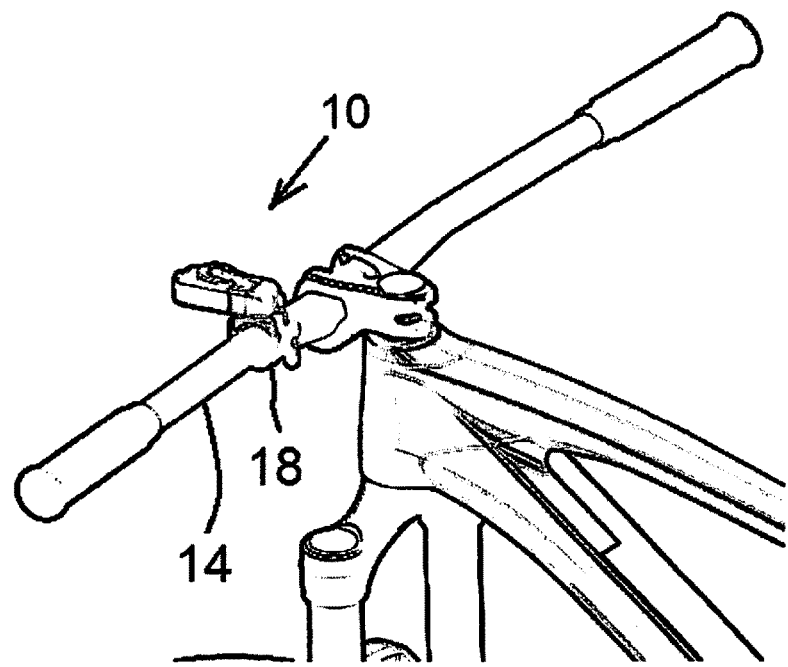

FIGS. 1A and 1B show the bicycle light assembly 10 of the invention attached to a bicycle, i.e. to a bicycle seat post 12 and to a handlebar 14, respectively. These connections to the bike can be made using connectors such as on Light & Motion Industries Urban bicycle light mountings, which can be seen at lightandmotion.com. As the drawings illustrate, mounting brackets 16 and 18 (preferably with stretchable bands as shown) are secured to the seat post or to the handlebar, and these mounting brackets, as on the Urban bicycle light, have a slot (not shown) onto which the light assembly 10 slides to firmly retain it in place. However, other types of connection could be used.

Figure 2:
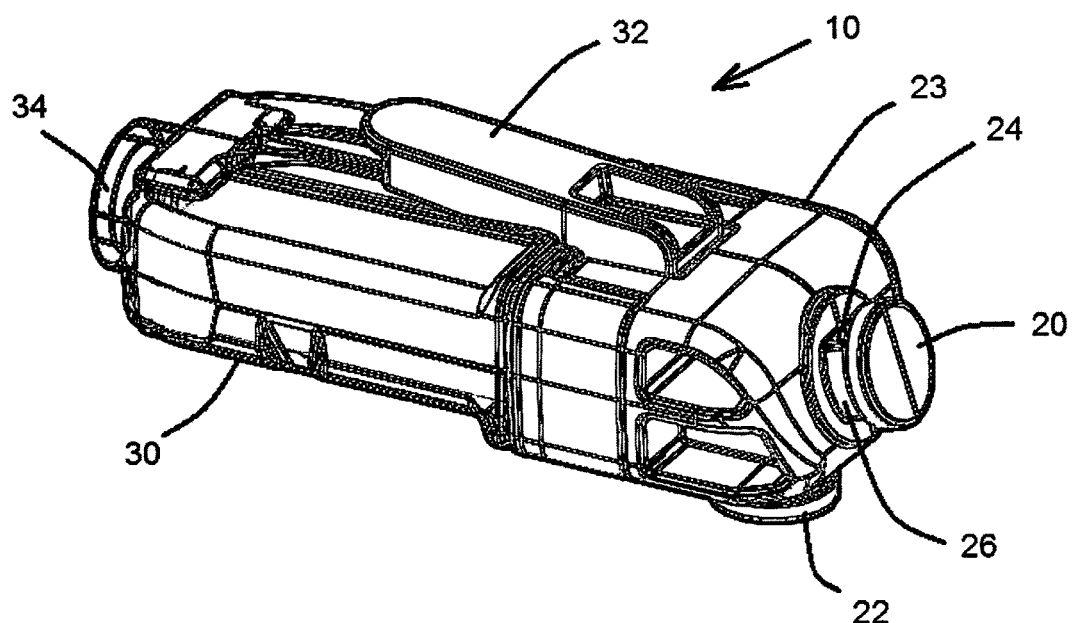
FIG. 2 is a perspective view showing the light assembly, including a base that becomes mounted to the bicycle.

FIG. 2 shows the light assembly 10 without connection to any bicycle bracket. FIG. 2 shows button mounts or "mushroom" mounts 20 and 22 at different orientations on a base portion 23 of the light assembly. These are oriented and configured to be received in slots on the bike bracket, e.g. for handlebar or seat post mounting; plastic engages plastic and a stable connection is made. FIG. 2 shows that the button mount 20 has opposed flats 24 on a stem 26, to hold the light unit in proper orientation on the bike. The lower button mount 22 is without flats because of the need for aiming of the light on many handlebars.

In a variation, the base 23 has a mounting band (not shown, similar to the stretchable mounting bands 16, 18 shown in FIGS. 1A and 1B) attached directly to the base, or permanently affixed thereto, eliminating the button mounts 20, 22. The orientation of the band is in accordance with the light's function as a head light or a tail light, and the base 23 preferably has a concave surface (as do the brackets 16, 18 in FIGS. 1A and 1B) approximately shaped and oriented to engage with either a handlebar or a seat post. Thus, the mounting bracket is built into the base portion 23.

As explained above, the light assembly 10 is in two components, a main LED light body 30 containing LED and electronics, and the base part 23, from which the main body 30 is separable. The base, as explained above, can include the bicycle mounting device if desired, thus involving fewer components. The main LED unit 30 assembles into the base portion 23. In one embodiment a pivoted lever latch 32 is provided to latch the two in the assembled configuration shown. In FIG. 2 the drawing shows a light projecting end 34, which can be an optic for the beam, on the main unit 30. This can be a tail light or a head light for the bike, as indicated in FIGS. 1A and 1B.

Figure 6:
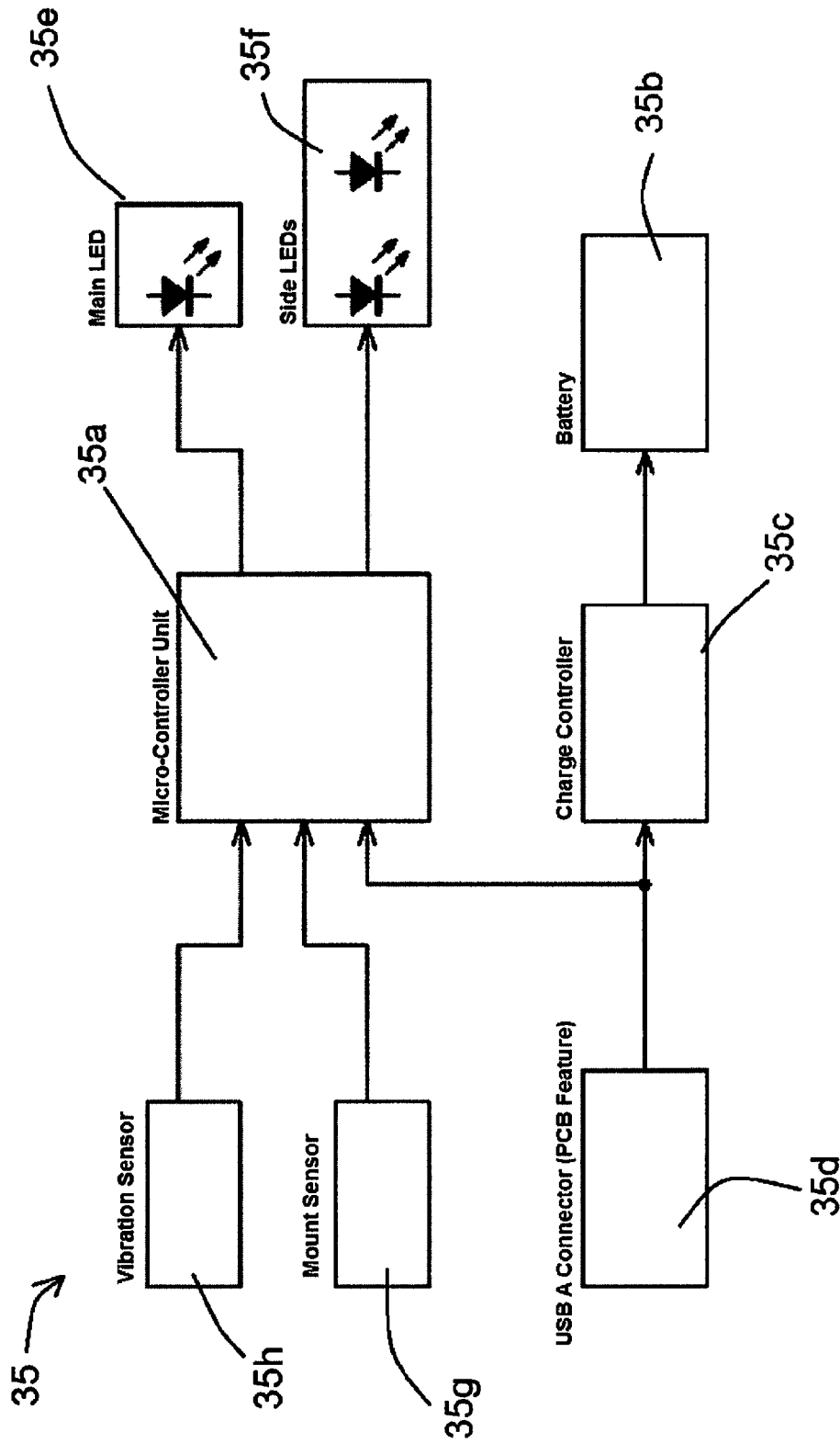
FIG. 6 is a simple overview schematic for the printed circuit board of the light assembly.

FIG. 6 is a simple schematic showing the basic circuit 35 of the light unit. The circuit includes a micro controller 35a, battery 35b, charge controller 35c and USB connector 35d. LEDs, main and side, are indicated at 35e and 35f. The circuit also includes a mount sensor switch 35g (sensing connection of the light unit to the base) feeding to the controller, and a vibration or motion sensor switch 35h feeding to the controller, to power the LEDs only when the light assembly is in motion.

Figure 5:
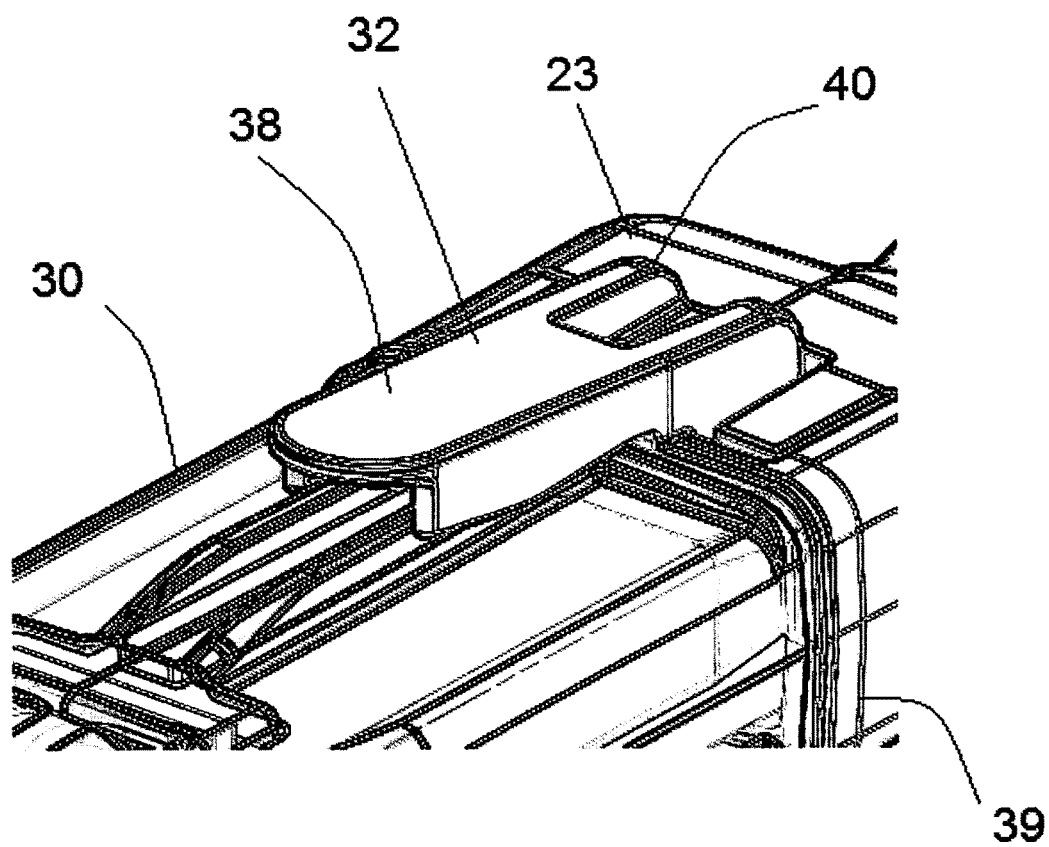
FIG. 5 is a partial view in perspective showing connection between the main light body and the base.

FIG. 5 is another detail view that shows the lever latch 32 acting to retain the units 30 and 23 together. The lever 32 is part of the main unit 30, being secured to the unit 30 preferably at a "plastic hinge" that allows rocking about a horizontal pivot axis. It is a thumb lever, pushed down at an end 38 to raise the opposite end 40, when the units are to be separated. This is better seen in FIG. 7, a cross section view that shows a compression spring 42 that can be included to bias the lever rotationally toward the latching position shown in FIG. 7. The plastic hinge is approximately at the locations 36 shown in FIG. 7. In the position shown, a ledge or hook 44 engages over a surface of the base unit 23. The lever latch can be part of a separate molded part 39 that is assembled onto a back end of the overmolded structure.

Figure 3:
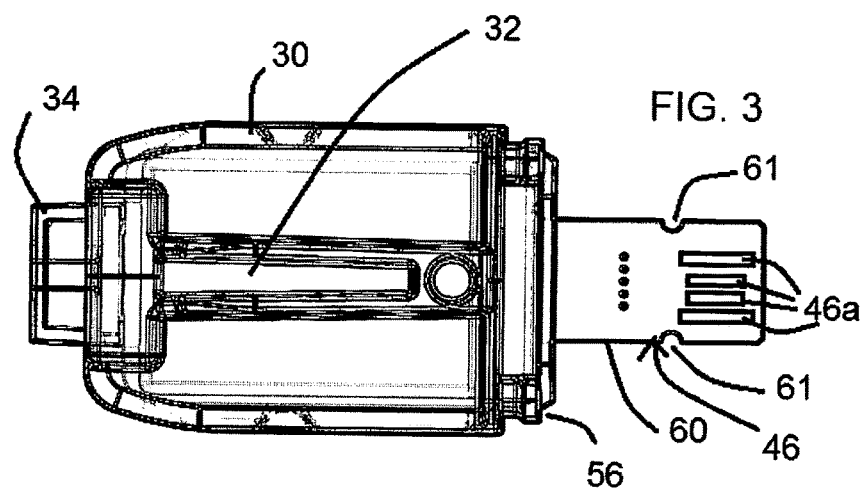
FIG. 3 shows in plan view a main light body of the assembly, with LEDs and internal electronics.
Figure 4:
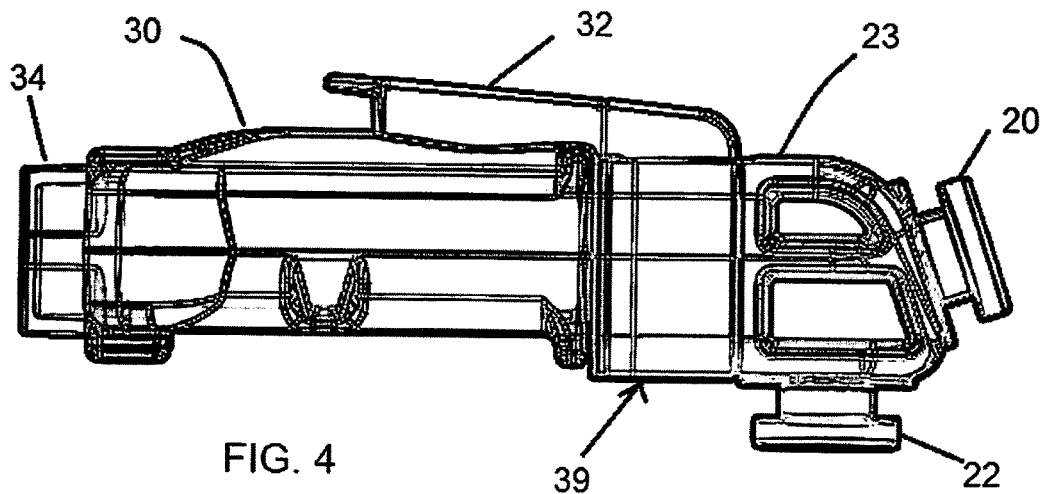
FIG. 4 is a side elevation view showing the light assembly including the base and the light body.
Figure 7:
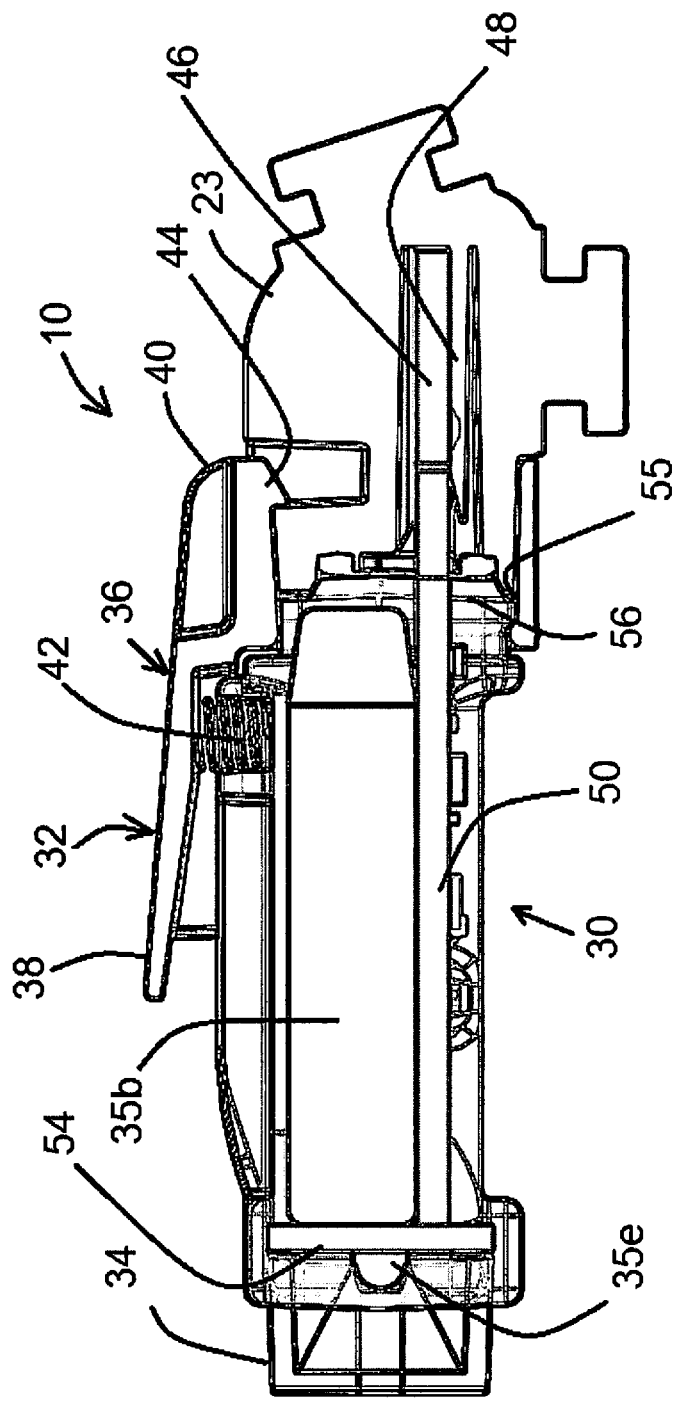
FIG. 7 is a sectional side elevation view showing the assembly, including the main light body and the base, with some internal components.

As shown in FIGS. 3, 4 and 7, the main LED unit 30 basically comprises a package of electronics including one or more LEDs, encapsulated in a plastic covering, except for an extending tongue comprising a USB blade 46 which slips into the slot 48 of the base unit 23 when the two are assembled. The electronics of the main unit 30 preferably are encapsulated by low-pressure overmolding as described above. Preferably all of the main LED light unit 30 is overmolded save the inside of the front optic 34 from which the light emerges and the outer connecting end of the extending blade 46. The low-pressure overmolding does not damage the electronics because of the low temperature and pressure, and even the battery is encapsulated along with the electronics (35a through 35h in FIG. 6, although the mount sensor 35g may not be encapsulated) and is not damaged because of the short time involved and the failure of the heat from the overmolding to penetrate through the battery. Low-pressure overmolding is explained at moldmansystems.com, wikipedia.org/wiki/low_pressure_molding, and at miracoinc.com/services-capabilities.

Note that electrical aspects of the blade 46 are indicated as 35d in FIG. 6.

The tongue with USB-configured blade 46 is effective to help secure the main unit 30 to the base 23, or as the sole means of locking the two units together, as in alternative forms described below. FIG. 7 shows that this blade 46 extends deeply into the slot 48 of the base unit 23. The tongue/USB blade 46 is integral with and an extension of the circuit board 50 supporting the electronics of the LED unit 30, as shown in FIG. 7. FIG. 7 also shows one or more LEDs 35e mounted on an LED board 54 connected to the main electronics board 50. The optic 34 is also seen in better detail in FIG. 7.

As noted above, the light unit 30 and base unit 23 are sealed together against moisture intrusion when connected. For this purpose an O-ring 55 can be positioned as shown in FIG. 7, between a surface 56 of the overmolded light unit 30 structure (to which the O-ring is attached) and an adjacent surface of the base unit 23.

In the sectional view of FIG. 7 the battery for the light is indicated at 35b, positioned against or in close proximity to the circuit board 50. As noted above, the battery, along with the circuit board and attached/embedded electronics, and the LED board 54 and LED 35e, and also the optic 34, are encapsulated by low-pressure, low-temperature overmolding. The overmold can extend from the sides of the optic 34 back to a point on the extending tongue/USB blade approximately at a location 60 (FIG. 3), and is in direct contact with all exterior surfaces of the circuit board and electronics, battery and LED, forming an integral encapsulation of all these components. The overmold itself forms a casing and the light body 30 is without any other housing, avoiding assembly of components into a housing. The molding at point 60 is back far enough to assure the blade can function to plug into a USB port for charging of the battery. USB contacts are shown at 46a.

As seen in FIG. 3, the extending USB blade 46 can have a pair of opposed recesses 61 in the sides of the blade, shown as semicircular indentations in the drawing. These recesses, in one embodiment of the invention, are gripped by elements (not shown in FIG. 3) in the base 23, for retention of the two components 30 and 23 together, which can be without the lever latch 32.

The light assembly 10 of the invention has several important benefits. By the low-pressure overmolding the main LED unit 30 is made in a very efficient way and is compact in design, since the housing is simply a plastic overmolding onto the components and requires no structure to hold components in place in a housing. The circuit board extends out as a tongue/USB blade that can secure the light unit 30 to the base unit 23, without any electric coupling made via the USB blade. The protruding USB is used for charging when the light unit is removed from the base, but no additional USB cap or waterproof casing is needed, since the blade, when the light device 10 is in operable configuration, is covered and sealed in a waterproof manner via the base unit 23. The base unit 23 allows the light device to be secured to a seat post as a tail light, or to the handlebar as a front light, or for other purposes such as a diving light. When the battery is to be recharged, the main LED unit 30 is simply removed from the base 23, pulling the USB blade 46 out so that it can be plugged into a charging power supply or to a computer or other USB-supporting device. For the light to be powered requires that the unit 30 be attached to the base unit 23 and that the light assembly (the bicycle) has not been immobile for more than a preset period, e.g. a few minutes. The light assembly thus needs no user-accessible switch.

Figure 10:
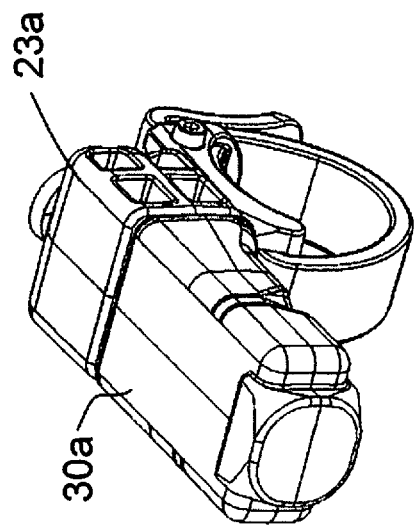
FIG. 10 is another perspective view, showing the main light unit fully rotated into locked position on the base unit.
Figure 8:
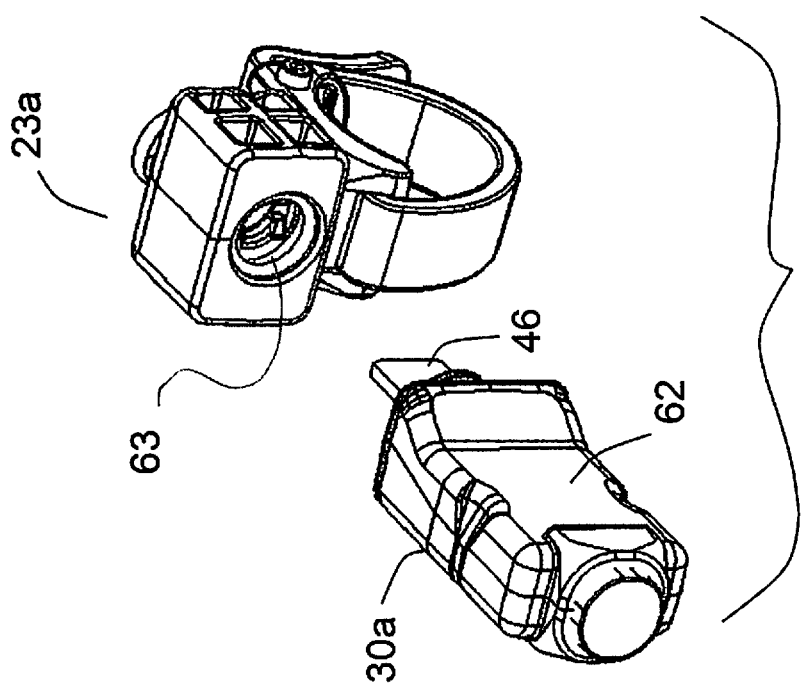
FIG. 8 is an exploded view in perspective showing another embodiment of the invention wherein the main light unit is latched to the base in a different way.

FIGS. 8 through 14 show another form of the bike light of the invention, with a different means of latching the light body to the base mounting unit. FIG. 8 shows the two components, the base unit 23a and the light body 30a, just before they are attached together. The PCB "tongue" or stick with blade 46 is shown at the back of the main light unit or body 30a. The unit 30a has a bottom 62 that is turned to the right, the light body 30a being oriented at 90° to the fully assembled position which is shown in FIG. 10. The base 23a has a receiving socket 63 into which the USB blade 46 will be inserted.

Figure 9:
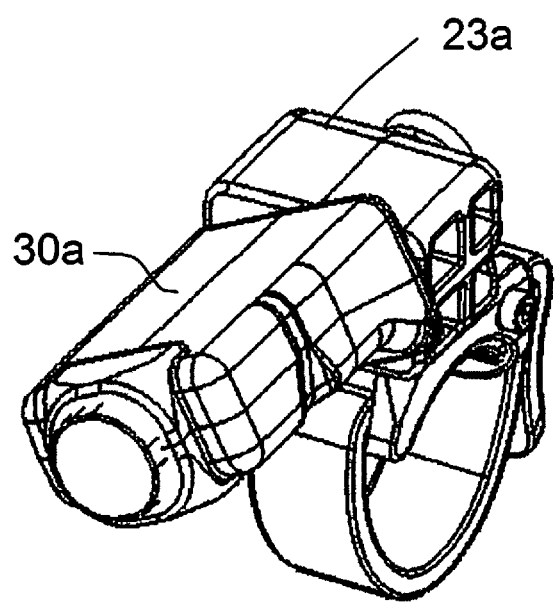
FIG. 9 is a perspective view showing the light unit inserted into a base unit and partially rotated.

FIG. 9 shows the light body 30a with its USB light inserted into the base 23a and partially rotated. In FIG. 10 the attachment is made and the two components are locked firmly in place, in sealed relationship.

FIG. 11 is a view showing the light body 30a with an O-ring seal 55 just forward of the USB tongue with blade 46, and showing the mounting base 23a into which the light body will be inserted. FIG. 12 shows the mounting base 23a and its receiving the socket 63 in better detail. Internal components are seen, including ¼ turn locking features 66 that interact with locking notches on the USB blade, the notches being shown at 68 and 69 in FIG. 11 (somewhat different from those depicted in FIG. 3), when the USB tongue is inserted into the socket 63 of the base, in the position shown in FIG. 8. It can be envisioned that with the notched tongue/USB blade 46 in the socket, the notches 68 and 69 engage with the features 66 and, when the housing body is rotated ¼ turn as explained above, the notches will lock onto those features and retain the two components 23a and 30a firmly together, with the O-ring 55 making a watertight seal. No external spring latch is needed in this embodiment.

Also seen in FIG. 12 is a switch finger 70 of the base unit 23a. This finger 70, fixed in position, engages with a switch button on the light body to close a power circuit in the light body as the light body is rotated fully into place on the mounting base. This button switch is not seen in detail in the drawings, but it is within the volume sealed by the O-ring 64 and is positioned on the USB tongue. In this way, as described above, the power circuit in the light body is enabled, but the light will not be powered until the motion detector on the circuit board activates the light.

Figure 13:
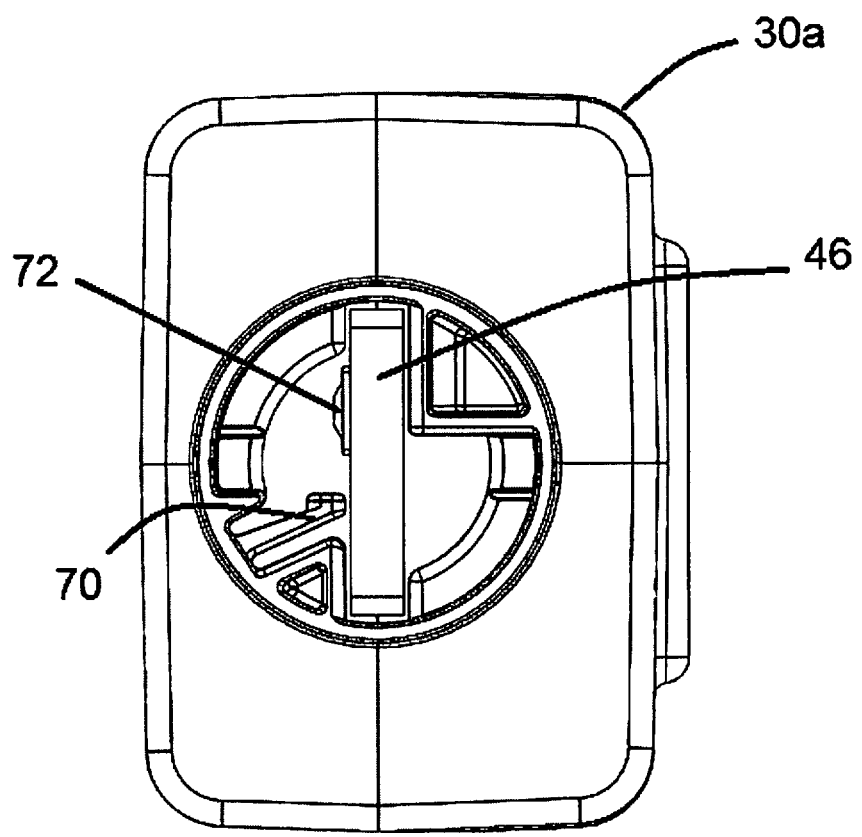
FIG. 13 is a plan view revealing the details of the back end of the main light body unit.
Figure 14:
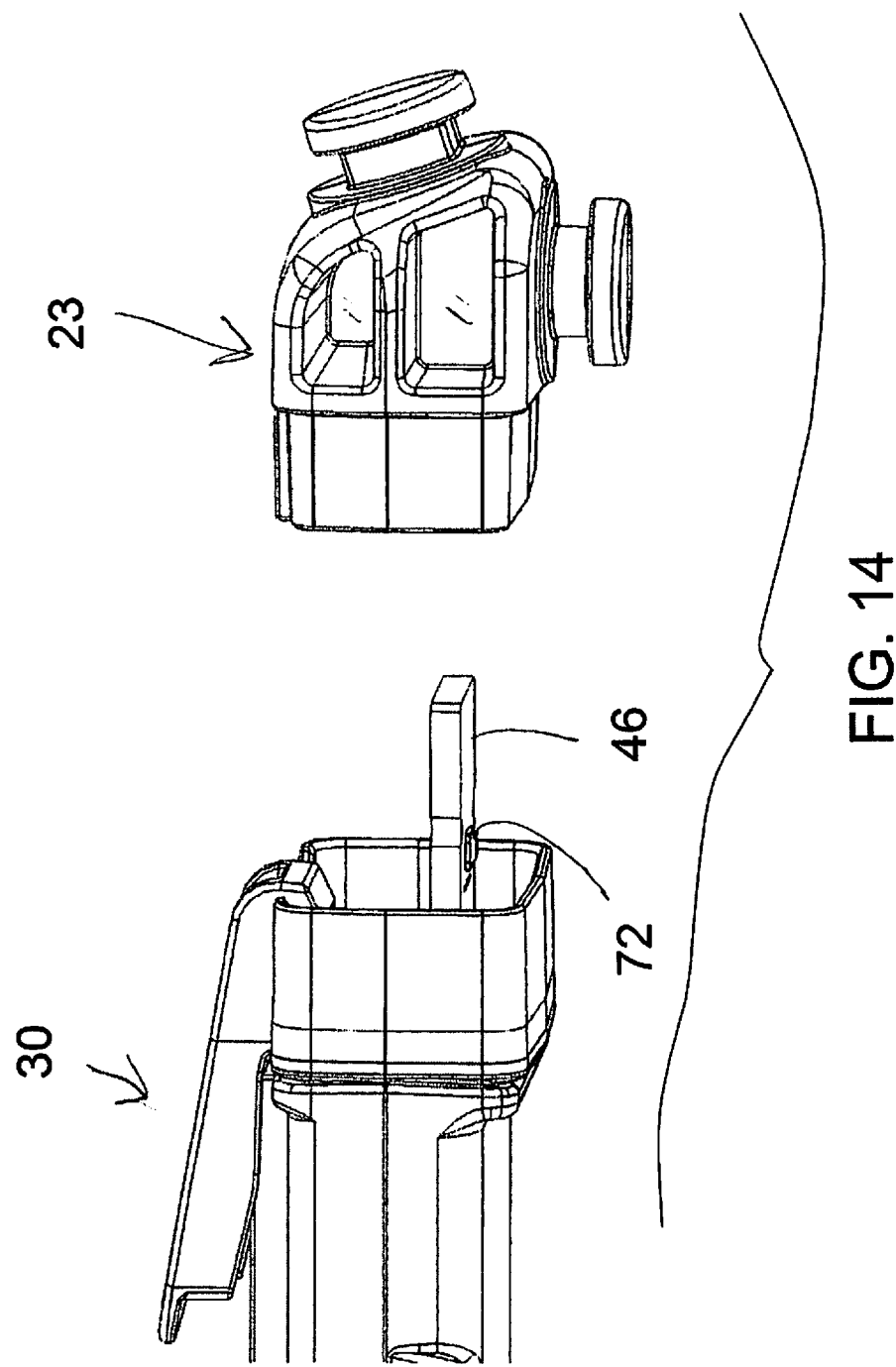
FIG. 14 is an exploded view in perspective showing another alternative for the light device of the invention.

FIGS. 13 and 14 are further views showing the switching feature that acts when the two units are coupled together. In FIG. 13 the rear end of the light body 30a is shown, with the protruding USB blade or tongue 46. The drawing also shows some of the mounting features that are in the base unit 23a, including the stationary switching finger 70. The view of FIG. 13 assumes the two units have been pushed together but the light body 30a has not yet been rotated. When the light body 30a is rotated, which will be counterclockwise as seen in FIG. 13 (clockwise as seen in FIG. 8), the light body's spring button switch, shown at 72 and mounted on the tongue portion of the circuit board, will move left/ downwardly and into contact with the switching finger 70, closing the power circuit. The switching finger 70, being part of the base mounting unit 23a, will remain in the position shown.

In FIG. 14 a switching arrangement is illustrated for the first-described embodiment, for activating main power to the light body 30 when coupled to the mounting base 23. The units 30 and 23 are in the form shown in FIGS. 1 through 7, but the switch being described here could be used with other latching configurations.

Figure 15:
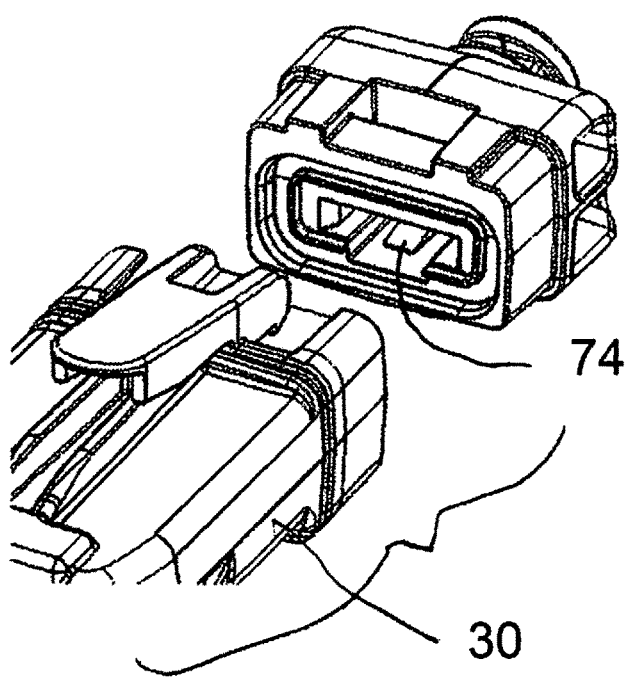
FIG. 15 is an exploded partial view in perspective showing the features of FIG. 14.

The USB tongue 46 extends out the back of the light body 30, and has, as part of the circuit board and at the base region of the USB tongue, a button switch 72 (spring-biased momentary switch) such as shown in the embodiment illustrated in FIG. 13. When the light body is connected to the base 23, as indicated in FIG. 15, the button switch 72 will engage down against a switching finger 74, which will depress and close the switch.

Figure 17:
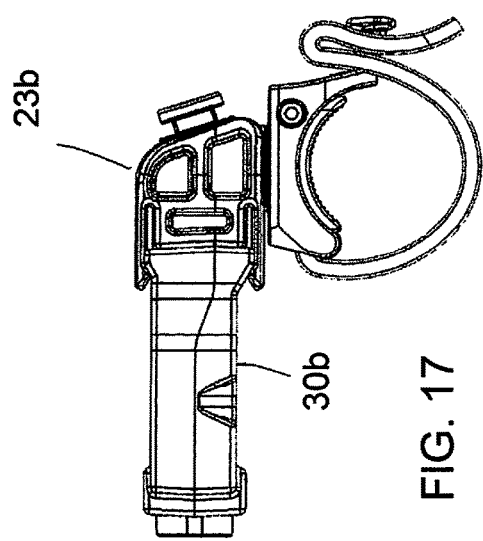
FIGS. 16 and 17 are side views showing another form of latching arrangement to connect the two components.
Figure 16:
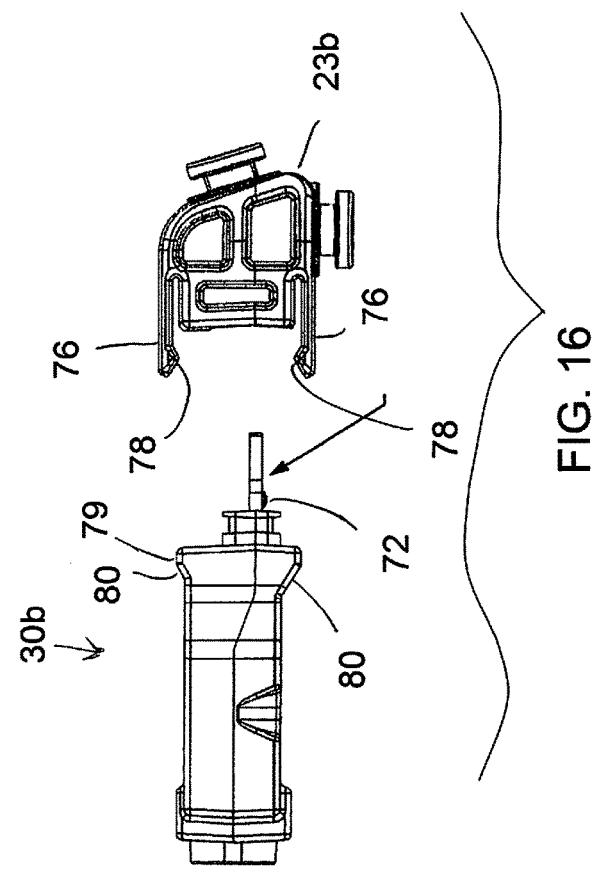
Figure 21:
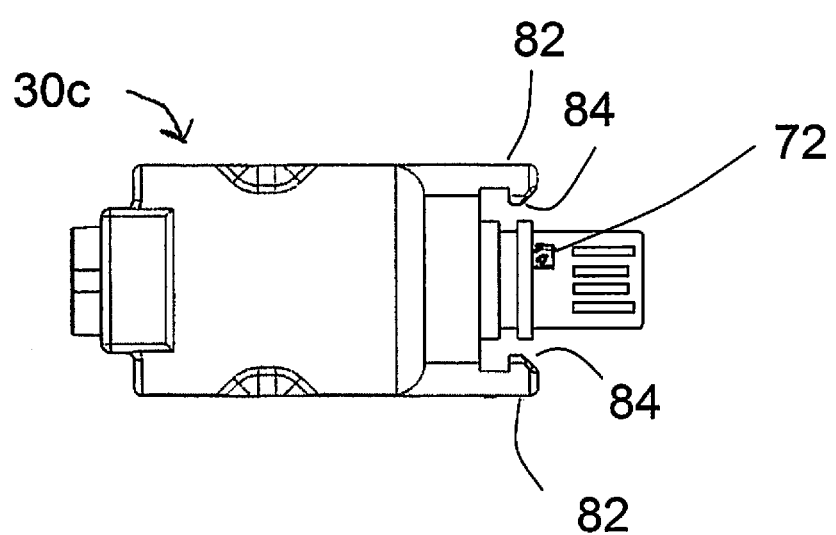

FIGS. 16 and 17 show another embodiment that can have the same form of button switch 72 activated on attachment of the light body 30b and the base unit 23b together, but with a different latching structure. Here, the latch comprises a pair of latch arms 76, shown as upper and lower arms, each with a latch barb 78 to engage with the light body. The light body is provided with an enlarged back end 79 with sloped barb-receiving surfaces 80. As can be seen from FIGS. 16 and 17, the light body 30b is simply pushed straight back into engagement with the base 23b, which causes the latching arms 76 to spread apart momentarily and then snap into place, firmly locking the light body to the base. Because of the sloped surfaces, the light body can be pulled out when charging is needed, by a pulling force that overcomes the latches. As in the previous described form of the invention, the button switch 72 is engaged by a structure in the base unit 23b when the two are connected together.

FIGS. 18 through 21 show another variation for latching the housing body 30c to the mounting base 23c. In this instance the latching device includes a pair of rigid latch arms 82 that are at the back of the light body 30c, at left and right. These have barbs or lobes 84, better shown in the bottom view of FIG. 21, that engage over a collar structure 86 on the base unit 23c. The collar 86 has flats 88 at top and bottom, so that the light body 30c, which is shown turned to an initial insertion position in FIG. 18, is pushed against the mounting base 23c, thus inserting the tongue/USB blade 46 into the base, and locating the latching arms and barbs 82 against the base unit, just past the collar 86. This position is shown in FIG. 19. The light body 30c is then rotated clockwise as shown by the arrow 90 in FIG. 19 and the assembled position shown in FIG. 20 results. The non-flat portions of the collar 86 firmly hold the two units together, again with an O-ring compressed between them. Switching via the coupling switch can be the same as in the previously described embodiment of FIGS. 8 to 13. Coupling and rotation activate the switch, which is seen at 72 in FIG. 21. FIGS. 22 and 23 further illustrate the co-action between the two units as the coupling is made. These views are looking back toward the front end 34 of the light body 30c; i.e. FIG. 22 is a view essentially from the plane 22-22 in FIG. 19. FIG. 22 shows parts of both units, but looking forward at the rear of the light body 30c. The base unit 23c has internal keying features to guide the tongue/USB blade 46 into position. FIG. 22 shows the latching arms 82 and lobes 84 and the USB tongue 46, the light body 30c being in the initial position prior to locking, as shown in FIG. 19. The units have not yet been locked together, and the button switch 72 is approximately at the position shown. The switch tripping finger, similar to that shown in FIG. 12, is indicated at 70. As the main light body unit 30c is rotated, which would be counterclockwise in viewing FIGS. 22 and 23, the latching barbs or lobes 84 become securely engaged behind the collar 86, with FIG. 23 showing the lobes in front of the collar since this is a view from the rear. In FIG. 23 the switching finger 70 has engaged the button switch and activated the power circuit.

As mentioned above, the switch operated by mounting the light unit to the base can be a different type of switch from that shown. It can be a capacitance switch similar to those used for finger-touch on smartphone screens. The capacitance switch can be located on the USB blade, in a position to touch or nearly touch a conductive plastic surface within the base unit 23c, or in the base unit 23a in the embodiment shown in FIGS. 8-13. The poles for the capacitance switch can be on either side of the blade, or polarity could be split between the two sides, with locations near outer edges so that a rotation of the USB blade fully into position is required to operate the switch. For example, a capacity switch could be located at the position 90 indicated in FIGS. 22-23.

In another form and application of the invention, the light unit or light body 30 is an underwater light. As explained above, the overmolded construction, directly over the LED(s), electronics and battery, lends itself efficiently to waterproofing the light unit. In the case of an underwater light, the light body 30 is inserted into a handle or wrist-worn base with a mounting device, or it can be secured to a diving helmet or mask or into a base that is part of an underwater camera housing. When attached into the base, everything in the light unit 30, including the extending tongue with USB blade, is isolated from the water environment. In one implementation, similar to what is described above, the tongue is pushed into the base in one rotational position, then rotated to lock it into place on the base. In the case of the UW version, there can be two different rotational positions, in addition to the position of insertion. For example, rotating the light body by 45° after insertion can simply secure the two units together in a waterproof connection. Full rotation to the 90° position is then effective to provide power to the light, via tripping a momentary switch as described above.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A bicycle light, comprising:
   a base unit with a mounting device for connection to a part of a bicycle,
   an LED light unit insertable into the case or shell, the light unit including an LED, a printed circuit board including an LED driver driving the LED, a rechargeable battery connected to the printed circuit board and, at one end the printed circuit board including an extending tongue comprising a USB blade configured to be inserted into and to closely fit into a USB charging port or into a receiving slot, the USB blade having conductors positioned to receive charging power when the blade is inserted into a powered USB charging port, and
   the base unit having a receiving slot extending interiorly and of size to receive the light unit by sliding the tongue with the USB blade of the light unit into the receiving slot to grip the USB blade and fully enclose the USB blade within the base unit, the receiving slot being without power contacts and configured for retention of the light unit to the base unit; and
   wherein the printed circuit board further includes a motion detector for detecting motion of the bicycle light, such that the bicycle light is powered by the battery only when the bicycle light has not been immobile for more than a preset period of time.

2. The bicycle light of claim 1, wherein the mounting device is separable from the base unit.

3. The bicycle light of claim 1, wherein the bicycle light is a headlight, the LED producing white light.

4. The bicycle light of claim 1, wherein the bicycle light is a tail light, the LED producing red light.

5. A bicycle light, comprising:
   a base unit with a mounting device for connection to a part of a bicycle,
   an LED light unit insertable into the case or shell, the light unit including an LED, a printed circuit board including an LED driver driving the LED, a rechargeable battery connected to the printed circuit board and, at one end the printed circuit board including an extending tongue comprising a USB blade configured to be inserted into and to closely fit into a USB charging port or into a receiving slot, the USB blade having conductors positioned to receive charging power when the blade is inserted into a powered USB charging port, and
   the base unit having a receiving slot extending interiorly and of size to receive the light unit by sliding the tongue with the USB blade of the light unit into the receiving slot to grip the USB blade and fully enclose the USB blade within the base unit, the receiving slot being without power contacts and configured for retention of the light unit to the base unit;
   a main power switch for controlling power to the LED such that power cannot be supplied to the LED unless the LED light unit is connected to the base unit.

6. The bicycle light of claim 5, wherein the main power switch comprises a switch on the tongue of the light unit, activated by assembly of the light unit with the base unit.

7. A bicycle light, comprising:
   a base unit with a mounting device for connection to a part of a bicycle,
   an LED light unit insertable into the case or shell, the light unit including an LED, a printed circuit board including an LED driver driving the LED, a rechargeable battery connected to the printed circuit board and, at one end the printed circuit board including an extending tongue comprising a USB blade configured to be inserted into and to closely fit into a USB charging port or into a receiving slot, the USB blade having conductors positioned to receive charging power when the blade is inserted into a powered USB charging port, and
   the base unit having a receiving slot extending interiorly and of size to receive the light unit by sliding the tongue with the USB blade of the light unit into the receiving slot to grip the USB blade and fully enclose the USB blade within the base unit, the receiving slot being without power contacts and configured for retention of the light unit to the base unit; and
   wherein the printed circuit board includes motion sensor means for switching on power to the LED only when the LED light unit has not been immobile for more than a preset period of time, and a main power switch for providing power only when the LED light unit is attached to the base unit, so that the LED is not powered unless (a) the LED light unit has been attached to the base unit and (b) the bicycle light has not been immobile for more than a preset period of time, and the bicycle light being without an exterior switch.

8. A bicycle light, comprising:
a base unit with a mounting device for connection to a part of a bicycle,
an LED light unit insertable into the case or shell, the light unit including an LED, a printed circuit board including an LED driver driving the LED, a rechargeable battery connected to the printed circuit board and, at one end the printed circuit board including an extending tongue comprising a USB blade configured to be inserted into and to closely fit into a USB charging port or into a receiving slot, the USB blade having conductors positioned to receive charging power when the blade is inserted into a powered USB charging port, and
the base unit having a receiving slot extending interiorly and of size to receive the light unit by sliding the tongue with the USB blade of the light unit into the receiving slot to grip the USB blade and fully enclose the USB blade within the base unit, the receiving slot being without power contacts and configured for retention of the light unit to the base unit; and
wherein the LED light unit comprises the printed circuit board, battery and LED encapsulated in a low-pressure overmolding, through the length of the LED light unit and encapsulating a portion of the extending tongue of the printed circuit board essentially to the USB blade, with molding material in direct contact with and encapsulating the circuit board, battery and LED to form an integral casing, which is a sole casing of the LED light unit, whereby the LED light unit is completely waterproof.

9. The bicycle light of claim 8, wherein the LED light unit is without an external switch.

10. The bicycle light of claim 8, wherein the base unit and the LED light unit have sealing means for forming a waterproof seal between the base unit and light unit when attached together thus sealing the USB blade within the base unit.

11. A bicycle light, comprising:
a base unit with a mounting device for connection to a part of a bicycle,
an LED light unit insertable into the case or shell, the light unit including an LED, a printed circuit board including an LED driver driving the LED, a rechargeable battery connected to the printed circuit board and, at one end the printed circuit board including an extending tongue comprising a USB blade configured to be inserted into and to closely fit into a USB charging port or into a receiving slot, the USB blade having conductors positioned to receive charging power when the blade is inserted into a powered USB charging port, and
the base unit having a receiving slot extending interiorly and of size to receive the light unit by sliding the tongue with the USB blade of the light unit into the receiving slot to grip the USB blade and fully enclose the USB blade within the base unit, the receiving slot being without power contacts and configured for retention of the light unit to the base unit; and
wherein the extending tongue of the printed circuit board has at least one edge with a notch, and the base unit has interior structure in the receiving slot configured to engage with the notch such that, when the tongue with USB blade is pushed fully into the base unit and then rotated through a prescribed arc of rotation, the light unit will be locked in position against the base unit and sealed via an O-ring seal between the light unit and the base unit.

12. The bicycle light of claim 11, wherein the rotation of the USB blade through said arc is effective to close a main power switch in the light unit, whereby power cannot be supplied to the LED unless the LED light unit is connected to the base unit.

13. The bicycle light of claim 11, wherein a said notch is included on each of two opposed edges of the extending tongue.

14. The bicycle light of claim 11, wherein the arc of rotation is about 90°.

15. A bicycle light, comprising:
a base unit with a mounting device for connection to a part of a bicycle,
an LED light unit insertable into the case or shell, the light unit including an LED, a printed circuit board with electronics including an LED driver driving the LED, a rechargeable battery connected to the printed circuit board and, at one end the printed circuit board including an extending tongue comprising a USB blade configured to be inserted into and to closely fit into a USB charging port or to fit into a receiving slot, the USB blade having conductors positioned to receive charging power when the blade is inserted into a powered USB charging port,
the base unit having a receiving slot extending interiorly and of size to receive the light unit by sliding the tongue with the USB blade of the light unit into the receiving slot, the receiving slot being without power contacts, and
the LED light unit comprising the printed circuit board, battery and LED encapsulated in a low-pressure overmolding, through the length of the LED light unit and encapsulating a portion of the extending tongue of the printed circuit board essentially to the USB blade, with molding material in direct contact with and encapsulating the circuit board, battery and LED to form an integral casing, which is a sole casing of the LED light unit, whereby the LED light unit is completely waterproof.

16. The bicycle light of claim 15, wherein the printed circuit board includes motion sensor means for switching on power to the LED only when the LED light unit has not been immobile for more than a preset period of time, and a main power switch for providing power only when the LED light unit is attached to the base unit, so that the LED is not powered unless (a) the LED light unit has been attached to the base unit and (b) the bicycle light has not been immobile for more than a preset period of time, and the bicycle light being without an exterior switch.

17. The bicycle light of claim 15, wherein the extending tongue of the printed circuit board has at least one edge with a notch, and the base unit has interior structure in the receiving slot configured to engage with the notch such that, when the tongue with USB blade is pushed fully into the base unit and then rotated through a prescribed arc of rotation, the light unit will be locked in position against the base unit and sealed via an O-ring seal between the light unit and the base unit.

18. The bicycle light of claim 17, wherein the rotation of the USB blade through said arc is effective to close a main power switch in the light unit, whereby power cannot be supplied to the LED unless the LED light unit is connected to the base unit.

19. The bicycle light of claim 17, wherein a said notch is included on each of two opposed edges of the extending tongue.

20. The bicycle light of claim 15, wherein one of the light unit and the base unit has a pair of opposed latch arms to engage with the other of the light unit and base unit to retain the light unit and the base unit together when assembled, said latch arms being on the base unit and comprising cantilevered arms with barbs at ends, the light unit having a back end with barb-receiving surfaces such that when the light unit is pushed into the base unit the cantilevered arms spread apart elastically, then snap into place against the barb-receiving surfaces to firmly lock the light unit to the base unit.

21. The bicycle light of claim 15, wherein the light body includes latch arms at its back end, the latch arms being rigid and having ridges at outer ends, the ridges extending toward one another, and the base unit having a collar at an end of the base unit facing the light unit, the collar comprising a circular flange extending radially outwardly except at a pair of opposed flats on the collar at which the latch arms of the light unit can be received over the collar, after which the light unit can be rotated on the base unit through a prescribed arc to lock the light unit to the base unit via gripping of the ridges of the latching arms over the collar.

* * * * *